Patented June 18, 1940

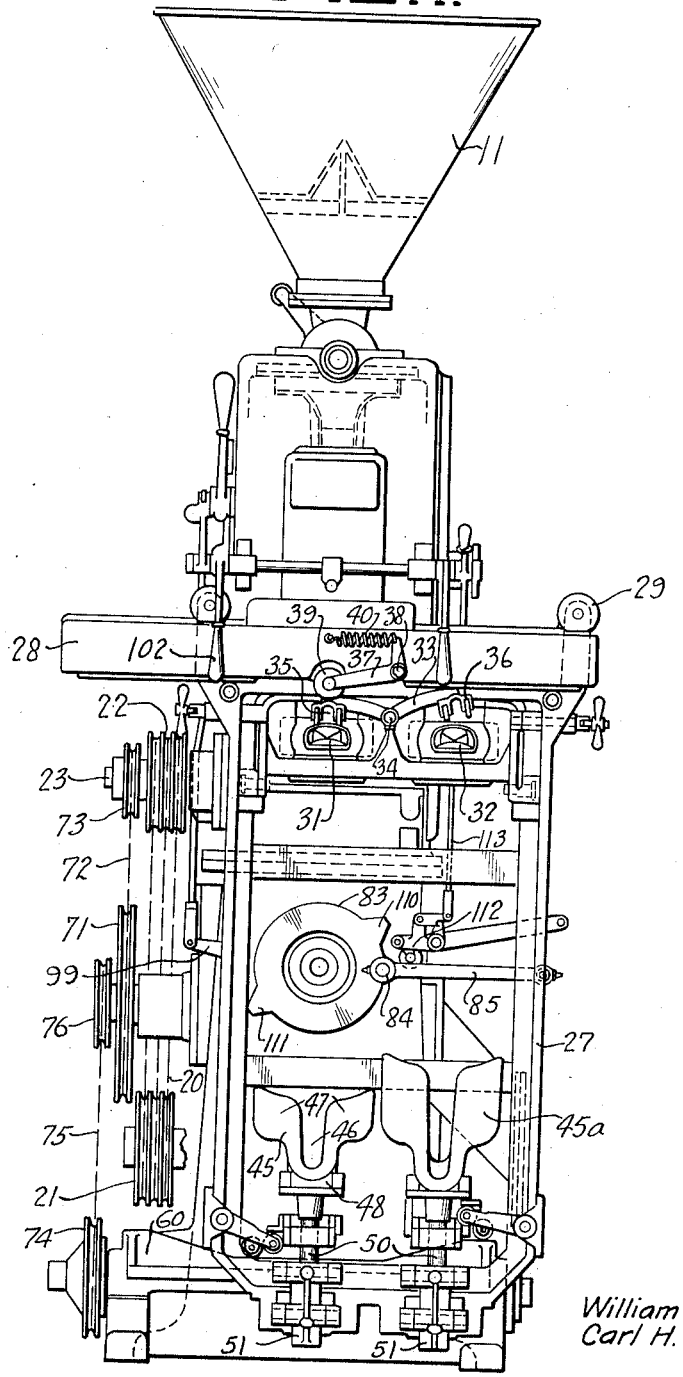

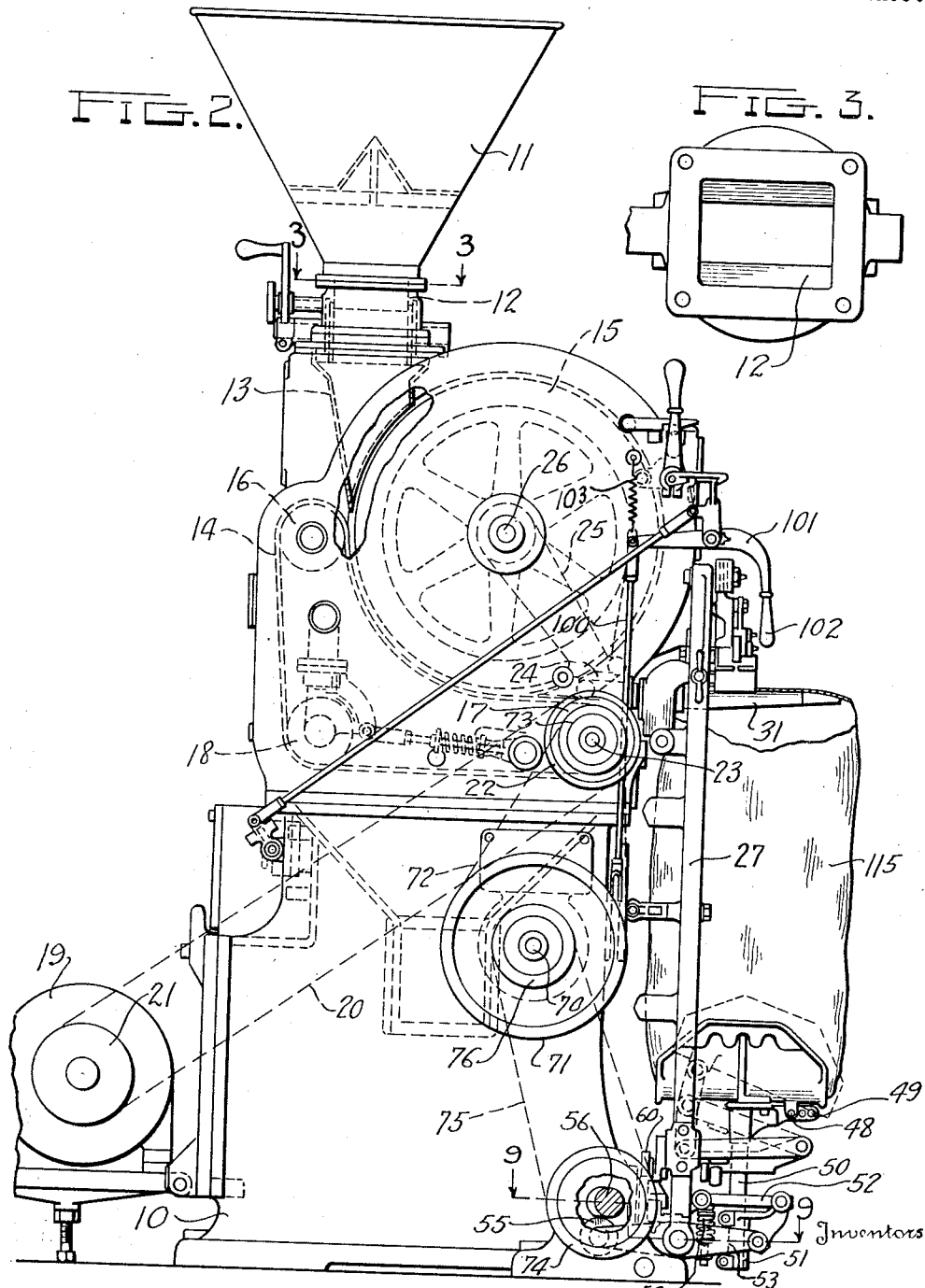

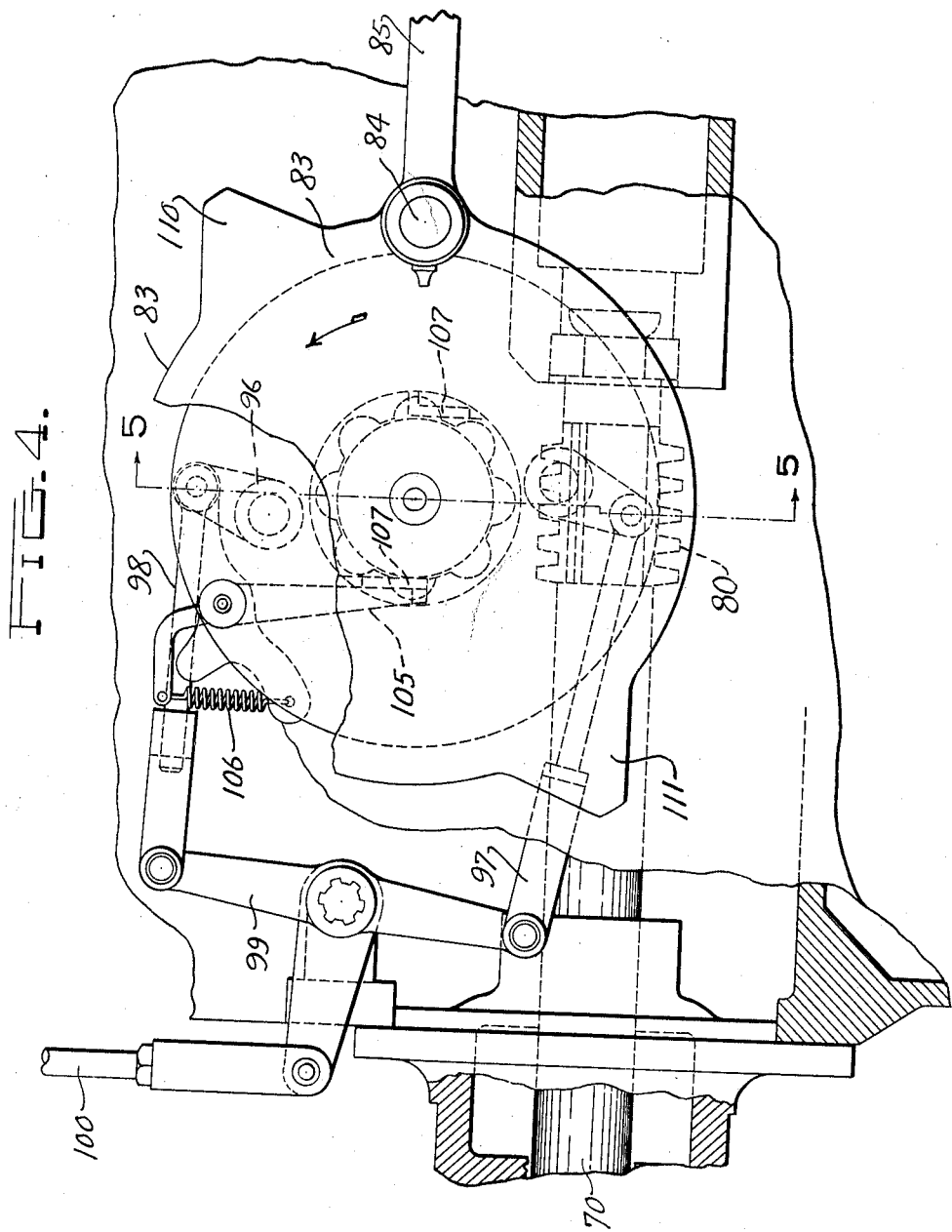

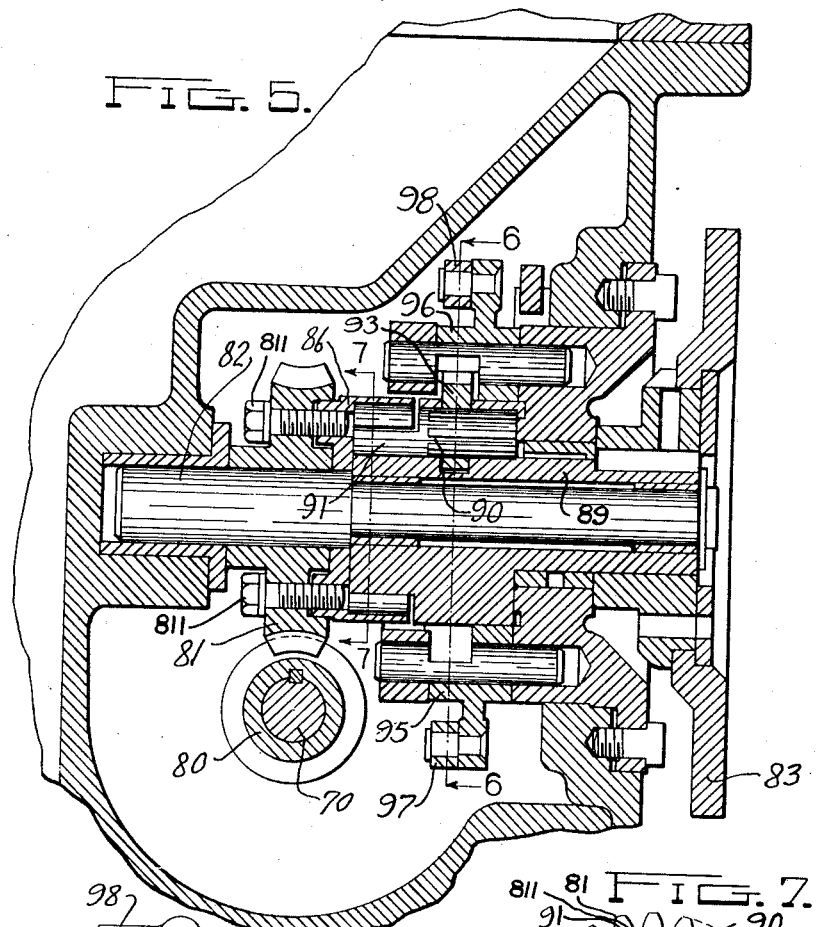
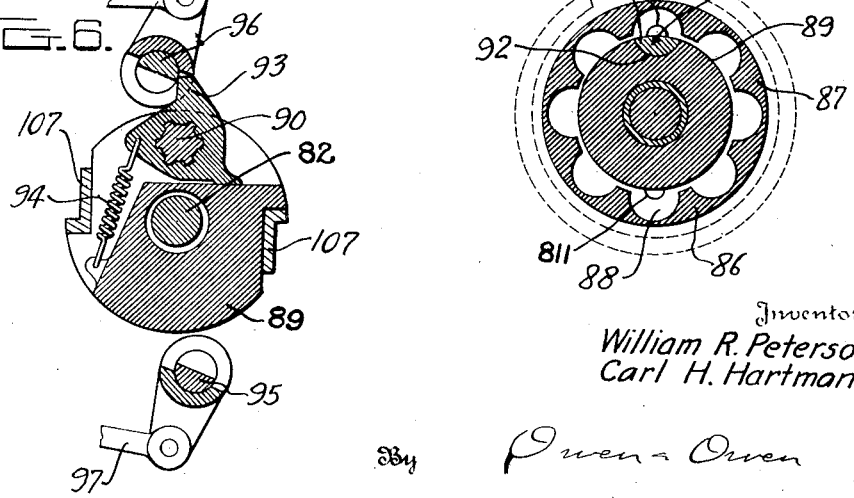

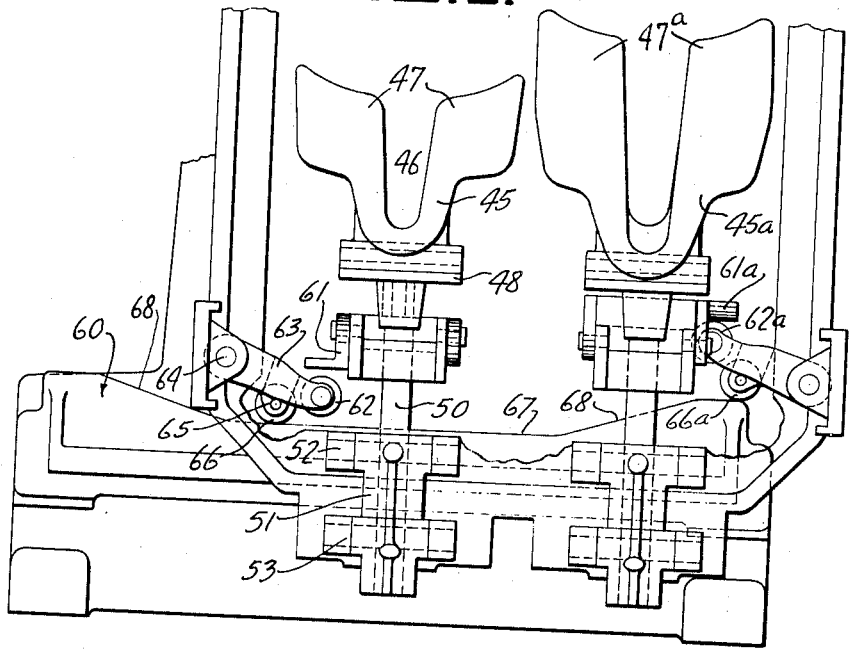
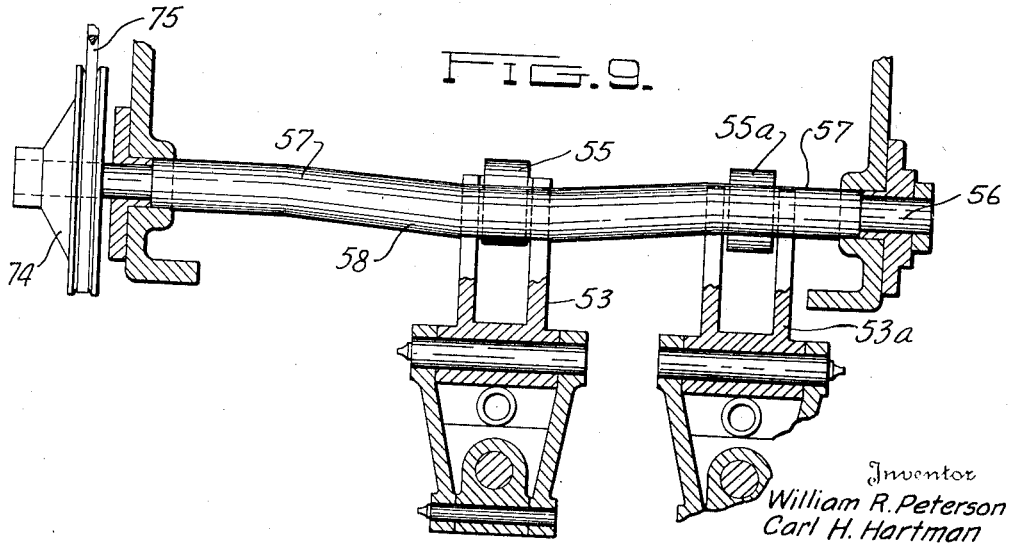

2,205,010

UNITED STATES PATENT OFFICE 2,205,010

BELT PACKER

Carl H. Hartman, New Rochelle, and William R. Peterson, Oswego, N. Y., assignors to St. Regis Paper Company, New York, N. Y., a corporation of New York Application November 26, 1937, Serial No. 176,494

20 Claims. (Cl. 226—48)

This invention relates to an improved apparatus for filling bags, particularly valve bags.

The object of the invention is to improve apparatus of this type so as to increase the rapidity of operation, the accuracy of the charges filled into the bags and the ease with which the apparatus may be operated.

Details and further features of the invention will appear as the description proceeds.

In the accompanying drawings forming a part of this specification,

Figure 1 is a front elevation of one form of apparatus embodying the invention;

Fig. 2 is a side elevation of the apparatus shown in Fig. 1;

Fig. 3 is a section along the line 3—3 of Fig. 2;

Fig. 4 is an enlarged detail of frame shifting mechanism, with parts broken away;

Fig. 5 is a section on the line 5—5 of Fig. 4;

Figs. 6 and 7 are sections on the lines 6—6 and 7—7, respectively, on Fig. 5;

Fig. 8 is an enlarged front elevation of a portion of the mechanism showing the automatic discharge of the bags, parts being removed to show more clearly the said operating mechanism;

Fig. 9 is a partial sectional view approximately along the line 9—9 of Fig. 2, showing the jigging shaft and connections.

In the form of apparatus shown, the mechanism is supported by a frame designated generally by 10. Weighed charges of material to be filled into bags are dropped into a hopper 11 by means of any suitable weighing device, not shown. At the bottom of the hopper, there is a throat 12 through which material drops from the hopper to a guide 13 and onto a belt 14. The belt contacts on its upper side a grooved pulley 15, and runs over an idler puller 16 and a drive pulley 17 and around a tightener 18. For driving the apparatus, there is provided a motor 19. A belt 20 driven by a pulley 21 rotated by the motor drives a pulley 22 on shaft 23 of the drive pulley 17.

Belt 14 extends horizontally for a short distance beyond the lowest point of grooved wheel 15, and a guide 24 is provided for completing a passage above the belt for material received from the groove of grooved wheel 15. The guide may be conveniently mounted on arms 25 that are pivoted upon shaft 26 of the wheel 15.

The apparatus thus far described is substantially similar to the apparatus disclosed in the prior patent on "Bag filling apparatus," No. 1,979,483, November 6, 1934. Among the principal improvements which constitute the essential features of this invention are the means for positioning bags in filling position and discharging the filled bags. This mechanism will now be described.

A shifting frame 27 is mounted for horizontal reciprocating movement upon a horizontal bar 28, being provided with anti-friction rollers 29 which run upon that bar. The frame is also suitably guided for horizontal movement at its lower end by means which need not be described in detail. Mounted upon the shifting frame are two discharge spouts 31 and 32, each adapted to enter the valve of a valve bag. A lever 33 is fulcrumed on the frame at 34, a point midway between the two discharge spouts, and is provided at its ends with clamping members 35 and 36 positioned above the respective spouts. A lever 37 is pivoted at 38 upon stationary bar 28, and is provided at one end with a roller 39 which contacts the upper side of lever 33 and is positioned in line with guide 24. A spring 40 connected with the other end of lever 37 presses roller 39 down upon lever 33, and forces the clamp at the end of the lever against the top of a filling spout when it is positioned in alignment with guide 24.

It will be readily seen that, as the shifting frame carrying the two spouts is shifted to the left from the position in which it is shown in Fig. 1, the roller 39 contacting the lever 33 first releases the clamp 35 over filling spout 31 and then depresses clamp 36 upon filling spout 32 as that spout comes in alignment with the guide 24.

Under each filling spout there is a bottom support, or saddle, and operating means therefor. As the devices are substantially duplicates, only the device cooperating with filling spout 31 will be described in detail, the device cooperating with spout 32 being designated by corresponding reference numbers with the letter $a$ added.

The bottom support or saddle or chair 45 is of any usual or desirable configuration, but is shown as being provided with a central slot 46 in which the bag bottom may rest when filling begins, with sloping sides 47 against which the sides of the bag bottom are pressed as filling material spreads the sides and shortens the bag.

The saddle is pivoted at 48 upon a bracket 49 on a vertical standard 50. To the bottom of the standard there is attached a bracket 51 connected to the frame 27 by a link 52 and lever 53. Bracket 51 is urged downward by a spring 64, and is supported by lever 53 the left end of which, as viewed in Fig. 2, is provided with an anti-friction roller 55 beneath shaft 56. As shown most clearly in Fig. 9, shaft 56 is straight at its ends 57 and bent at 58 in the middle. When the shifting frame is in position to align spout 31 with guide 24, roller 55 is beneath the bent portion 58, and moves up and down at every revolution of the shaft, thus jigging the saddle. At the same time, roller 55$^a$ is beneath a straight end portion 57, so that saddle is at rest.

It will be readily seen that shifting of frame 27 to the left, as viewed in Figs. 1 and 9, to bring spout 32 in alignment with guide 24, shifts roller 55 beneath a straight end portion 57 and moves roller 55a beneath the central bent portion 58, thereby stopping the jigging of saddle 45 and starting that of saddle 45a.

Between shaft 56 and the shifting frame there is a dumping cam rail 60, best shown in Fig. 8. Saddle 45 is provided with an adjustable lug 61 which overrides a roller 62 on arm 63 of a rock shaft 64 mounted in the shifting frame. On the other side of the frame, rock shaft 64 is provided with an arm 65 carrying a roller 66 that rides on cam rail 60.

The middle portion 67 of cam rail 60 is straight, and is low enough so that, when roller 6 rides on this portion, roller 62 does not raise lug 61; but each end portion 68 of cam 60 is slanted upward, so that, as roller 6 rolls up on portion 68, roller 62, and the rear end of saddle 45 are lifted to the dumping position in which rollers 66a and 62a and saddle 45a are shown in Fig. 8.

If desired, the shifting frame might be shifted by hand, but in the construction shown there is mechanical means for effecting the shifting. This means is driven by a shaft 70, the end of which carries a pulley 71 driven by a belt 72 from pulley 73 on shaft 23. Conveniently jigger shaft 56 may carry a pulley 74 driven by a belt 75 from a pulley 76 on shaft 70.

The details of the shifting clutch are shown in Figs. 4 to 7. As shown in these figures, shaft 70 has keyed thereon a worm 80 which drives a worm wheel 81 mounted loosely upon a shaft 82. On the end of shaft 82 there is a disc 83 provided with a crank pin 84 connected by a link 85 to the shifting frame. Shaft 82 and disc 83 are connectible at will to gear 81 by a one-half revolution clutch. The clutch comprises a driving member 86 fastened to wheel 81 by screws 811 provided with a ring 87 and a series of internal semicircular notches 88, and a driven member 89 provided with an oscillatable pin 90 having a cut away portion providing a semicircle 91 which may be oscillated to fit within socket 92 in member 89 or to fit partly within that socket and partly within a notch 88, thereby connecting the two members of the clutch.

Fast on pin 90 there is a trip member 93 which is urged by a spring 94 in a direction to turn portion 91 to driving position. Two catches 95 and 96 are provided adjacent the path of member 93, and either of these catches, when in normal position, engages the passing member 93 and swings it to disengaged position. The catches are connected by links 97 and 98 to opposite arms of a three-armed lever 99, the third arm of which is connected by a link 100 to trip lever 101 provided with a handle 102 for manual operation. A spring 103 normally raises link 100 and keeps the catches in stopping position.

A pawl 105 is normally urged by a spring 106 into a notch 107, and prevents reverse movement of disc 83.

Disc 83 is provided with cam projections 110 and 111 which are adapted to contact a trip member 112 and operate a rod 113 connected to a weighing device, not shown, to cause the dumping of a weighed charge into hopper 11 after disc 83 begins to move and long enough before the completion of the movement so that the charge will be dropped and begin to flow from hopper 11 onto the belt and be ready to enter the filling spout just as, or immediately after, it is shifted into alignment with guide 24. This prevents any waste of time waiting for filling to begin after the bag is in receiving position.

The operation of the device may be gathered from the foregoing description, but for convenience will be summarized.

It will be noted that thread 12 is rectangular in cross-section. Its width approximates that of the groove in pulley 15, but its length is materially greater than the depth of said groove.

When a bag 115 is to be filled, its valve is placed over a spout. Assuming that the reciprocating frame is to the left, instead of to the right as shown on Fig. 1, the empty bag is placed upon the spout 31. Then handle 102 is lifted and lever 99 rocked so as to cause a half revolution of plate 83 to the position in which it is shown in the drawings. This moves the reciprocating frame to the right into the position in which it is shown in Fig. 1. During the movement of plate 83, lug 110 trips a previously weighed charge, the tripping connections being so adjusted that the material falls through throat 12 onto belt 14, and the leading end of the stream reaches the spout 31 immediately after the spout is in position to receive it.

By the movement of the reciprocating frame, clamp 35 is brought into clamping relation with spout 31 and secures the bag thereon. At the same time, roller 55 is positioned over the bent middle portion 58 of shaft 56 and so the bottom support for the bag is given a jigging motion.

The stream of material dropping from throat 12 is speeded up and attenuated by gravity so that it enters freely into the groove in pulley 15. The size of the throat, the size of the groove, the distance of the throat above the groove, and the speed of the belt, are all proportioned so that there is no banking up or clogging of the stream at any point and so that it can be discharged cleanly through the spout into the bag. At the same time, the parts are calculated and operated so that the stream will move into the bag substantially as a unit and approximately fill the full cross-section of the tube. The stream remains approximately the same in width, but the speeding up of the material greatly reduces the vertical dimension of the stream as delivered through the spout from its dimension from right to left, as viewed on Fig. 1, when it passes through throat 12. Shaping the throat as shown results in utilization of the full capacity of the apparatus without clogging at any point.

By the time the weighed charge has been fully fed into the bag, another bag has been positioned on spout 32. Then the operator again operates handle 102, thereby connecting the clutch to give plate 83 another half turn. This moves the reciprocating frame to the left, as viewed in Fig. 1. This movement of the frame removes roller 55 from the bent portion of the shaft 56, thus stopping the jigging. At the same time, clamp 35 is first released and then positively lifted so as to free the valve end of the bag. Roller 66 runs up on slanting cam portion 68, tilts the bottom support, and the filled bag slides off of the machine to make way for an empty bag.

During the same movement of plate 83 and the reciprocating frame, the bag is clamped on spout 32, the bottom support is started to jigging, and a new weighed charge is called and delivered in time so that the forward end of the stream is delivered through spout 32 immediately after that spout reaches alignment with the belt and grooved pulley.

It will be seen that the apparatus described is a very simple and efficient construction which performs all of the necessary operations for filling valve bags except the placing of empty bags on the filling spout and indicating the time when the reciprocating frame is to be shifted, these acts being left for the attendant.

While the parts as disclosed cooperate to form a very simple and efficient construction, and in the preferred arrangement tripping the clutch to move the reciprocating frame results in actuating the various other devices, it will be readily understood that some of the features would retain some of their advantages when not used in connection with the other features. Also, while the preferred mechanical construction has been shown, it will be understood that many changes might be made in mechanical details. Therefore, the physical embodiment of the invention may be varied within the scope of the appended claims.

What we claim is:

1. Apparatus for filling valve bags, comprising means to receive a weighed charge of material and deliver it as a stream, two spouts, each adapted to enter the valve of a bag and guide material into the bag, a frame carrying the spouts and reciprocable to place the spouts alternately in line with the stream, a clamp associated with each spout, a bottom support associated with each spout, mechanical means for giving the frame one of its alternate movements each time it is tripped, manual means for tripping said mechanical means, a jigging device associated with each bottom support, a tilting device associated with each bottom support, and means controlled by said mechanical means for calling a weighed charge in timed relation with reciprocation of the frame, closing each clamp and actuating each jigging device as its associated spout is brought into alignment with the stream, and opening each clamp, stopping each jigging device, and tilting each bottom support as its associated spout is moved out of alignment with the stream.

2. In combination, a horizontally reciprocable frame, two substantially horizontal parallel spouts mounted on the frame and each adapted to enter the valve of a bag, the spouts being spaced apart a distance equal to the length of movement of the frame, whereby the spouts have a common central position, means to deliver a substantially horizontal stream of material in alignment with the common central position of the spouts, a clamp associated with each spout, means to apply the clamp to a bag on the spout as the spout is moved into said position, a support mounted upon the frame beneath each spout, means to jig each support when its associated spout is in said position, and means to tilt each support to dump a filled bag therefrom as it is moved away from said position.

3. Apparatus in accordance with claim 2, and comprising, as the clamp applying means, a lever fulcrumed between the spouts and carrying a clamp at each end, and a roller above said position and contacting the top of the lever.

4. Apparatus in accordance with claim 2, and comprising, as jigging means, a shaft parallel with the line of movement of said supports, the shaft being straight at its ends and bent in the middle, and means connected with each support and contacted by the middle of the shaft when the support is beneath said position.

5. Apparatus in accordance with claim 2, and said tilting means comprising a cam bar parallel with the line of movement of the supports and having a cam surface at each end, and cam-contacting means connected with each support and actuated by the respective cam surface when the support is moved away from beneath said position.

6. In combination, a horizontally reciprocable frame, two substantially horizontal parallel spouts mounted on the frame and each adapted to enter the valve of a bag, the spouts being spaced apart a distance equal to the length of movement of the frame, whereby the spouts have a common central position, means to deliver a substantially horizontal stream of material in alignment with the common central position of the spouts, a clamp associated with each spout, means to apply the clamp to a bag on the spout as the spout is moved into said position, a support mounted upon the frame beneath each spout, means to jig each support when its associated spout is in said position, and means to tilt each support to dump a filled bag therefrom as it is moved away from said position, and mechanical means for reciprocating the frame comprising a crank connected to the frame and means to move the crank 180° at a time.

7. In combination, a horizontally reciprocable frame, two substantially horizontal parallel spouts mounted on the frame and each adapted to enter the valve of a bag, the spouts being spaced apart a distance equal to the length of movement of the frame, whereby the spouts have a common central position, means to deliver a substantially horizontal stream of material in alignment with the common central position of the spouts, a clamp associated with each spout, means to apply the clamp to a bag on the spout as the spout is moved into said position, a support mounted upon the frame beneath each spout, means to jig each support when its associated spout is in said position, and means to tilt each support to dump a filled bag therefrom as it is moved away from said position, and means for reciprocating the frame comprising a constantly rotating member, a crank connected to the frame, a half-revolution clutch for connecting the member with the crank, and manually operable means for closing the clutch.

8. Apparatus for filling valve bags, comprising means to receive a weighed charge of material and discharge it through a throat in the form of a substantially rectangular stream, a belt onto which the stream is delivered, means to drive the belt rapidly with the material thereon and thereby reduce the depth of the stream on the belt while substantially maintaining its original width, two spouts, each adapted to enter the valve of a bag and guide material into the bag and being of a size and shape to just receive without clogging the stream delivered by the belt, a frame carrying the spouts and reciprocable to move the spouts alternately into alignment with the stream delivered by the belt, mechanical means for reciprocating the frame, and automatic means for calling a weighed charge in timed relation with the reciprocation of the frame.

9. Apparatus for filling bags comprising means to receive a weighed charge and deliver it as a stream, said means comprising a constantly rotating member, two receptacle supports, a frame carrying the supports and reciprocable to move receptacles on said supports alternately into position to receive said stream, a crank connected to the frame for reciprocating it, a half-revolution clutch for connecting said rotating member to the crank, and manual means for closing the clutch.

10. Apparatus for filling bags comprising means to receive a weighed charge and deliver it as a stream, said means comprising a constantly rotating member, two receptacle supports, a frame carrying the supports and reciprocable to move receptacles on said supports alternately into position to receive said stream, a crank connected to the frame for reciprocating it, a half-revolution clutch for connecting said rotating member to the crank, manual means for closing the clutch, and means operated by the clutch for calling a weighed charge in timed relation to the movement of the frame.

11. Apparatus for filling valve bags comprising means to deliver a stream of material, a plurality of spouts, a frame carrying the spouts and movable to position the spouts in succession in alignment with the stream, a clamp associated with each spout and adapted to clamp a bag thereon, and means mounted adjacent the path of the stream and adapted to actuate each clamp in succession into clamping position as its associated spout is brought into alignment with the stream.

12. Apparatus for filling valve bags comprising means to deliver a stream of material, a plurality of spouts, a frame carrying the spouts and movable to position the spouts in succession in alignment with the stream, a clamp associated with each spout and adapted to clamp a bag thereon, and a roller mounted over the path of the stream in position to contact and actuate each clamp in succession to clamp a bag on its associated spout as it is brought into alignment with the stream.

13. Apparatus for filling valve bags comprising means to deliver a stream of material, a plurality of spouts, a frame carrying the spouts and movable to position the spouts in succession in alignment with the stream, a clamp mounted upon a lever arm above each spout and adapted to clamp a bag upon its associated spout when its associated lever arm is depressed, and a roller mounted above the line of the stream in position to contact and depress each of said lever arms in succession as its associated spout is brought into alignment with the stream.

14. Apparatus for filling valve bags comprising means to deliver a stream of material, two spouts, each adapted to enter the valve of a bag and guide material into the bag, a frame supporting the spouts and reciprocable to bring the spouts alternately into alignment with the stream, a lever mounted on the frame and having an arm carrying a clamp in position to clamp a bag on each spout, and means contacting the lever when the frame is reciprocated and moving into clamping position the clamp associated with the tube in line with the stream and removing from clamping position the clamp associated with the other spout.

15. Apparatus for filling valve bags comprising means to deliver a stream of material, two spouts, each adapted to enter the valve of a bag and guide material into the bag, a frame supporting the spouts and reciprocable to bring them alternately into alignment with the stream, a lever mounted on the frame between the spouts and having an arm extending upward over each spout, a clamp on each arm adapted to clamp a bag on the spout thereunder when the arm is depressed, and a roller mounted above the path of the stream and in contact with the upper side of said lever, whereby the arm of the lever brought under the roller is depressed and the opposite arm is elevated.

16. Apparatus for filling valve bags comprising means to deliver a stream of material, two spouts, each adapted to enter the valve of a bag and guide material into the bag, a bottom support beneath each spout, a reciprocable frame carrying both spouts and supports and movable to place the spouts alternately in alignment with the stream, and means actuated by the reciprocation of the frame for tilting each bottom support and discharging a filled bag therefrom as it is moved away from its position in alignment with the stream.

17. Apparatus for filling valve bags comprising means to deliver a stream of material, two spouts, each adapted to enter the valve of a bag and guide material into the bag, a bottom support beneath each spout, a reciprocable frame carrying both spouts and supports and movable to place the spouts alternately in alignment with the stream, a cam bar mounted in the rear of the path of movement of the supports, each end of the bar being raised, and a member connected with each support and contacting the raised end of the cam bar and tilting the associated support to discharging position when it is moved to its extreme position out of alignment with the stream.

18. Apparatus for filling receptacles, comprising means to deliver a stream of filling material, a frame, two receptacle supports pivotally mounted on the frame in position to bring receptacles on said supports alternately in alignment with said stream, a stationary member adjacent the path of said supports, and means movable with the support and actuated by movement with respect to said stationary member to tilt each support and discharge the filled receptacle therefrom as it moves away from alignment with said stream.

19. In filling apparatus, a reciprocable frame, two supports mounted on the frame and shifted alternately to and from filling position by the movement of the frame, constantly moving means adjacent the support in filling position, and connections movable with each support and contacting said moving means to jig the associated support when it is moved to filling position.

20. In filling apparatus, a reciprocable frame, two supports mounted on the frame and shifted alternately to and from filling position by the movement of the frame, a shaft parallel with the line of movement of the supports and bent in the middle, and means movable with each support and contacting the middle of the shaft when the associated support is in filling position and resting adjacent a straight end of the shaft when the associated support is away from filling position.

CARL H. HARTMAN.
WILLIAM R. PETERSON.